US012606697B2

(12) United States Patent
Pesek et al.

(10) Patent No.: US 12,606,697 B2
(45) Date of Patent: Apr. 21, 2026

(54) HIGH FLOW PROPYLENE-BASED INTERPOLYMER COMPOSITIONS

(71) Applicant: Dow Global Technologies LLC, Midland, MI (US)

(72) Inventors: Stacy L. Pesek, Pearland, TX (US); Xiaosong Wu, Sugar Land, TX (US); Ronald J. Weeks, Lake Jackson, TX (US); Yushan Hu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 588 days.

(21) Appl. No.: 17/997,460

(22) PCT Filed: Apr. 29, 2021

(86) PCT No.: PCT/US2021/030002

§ 371 (c)(1),
(2) Date: Oct. 28, 2022

(87) PCT Pub. No.: WO2021/222650

PCT Pub. Date: Nov. 4, 2021

(65) Prior Publication Data

US 2023/0167289 A1 Jun. 1, 2023

Related U.S. Application Data

(60) Provisional application No. 63/017,541, filed on Apr. 29, 2020.

(51) Int. Cl.
*C08L 23/14* (2006.01)
*C08L 91/00* (2006.01)

(52) U.S. Cl.
CPC ............... *C08L 23/14* (2013.01); *C08L 91/00* (2013.01)

(58) Field of Classification Search
CPC ........... C08L 91/00; C08L 91/06; C08L 23/10
See application file for complete search history.

(56) References Cited

U.S. PATENT DOCUMENTS

| | | | |
|---|---|---|---|
| 7,294,681 B2 | 11/2007 | Jiang et al. | |
| 7,357,971 B2 | 4/2008 | Bieser et al. | |
| 7,524,910 B2 | 4/2009 | Jiang et al. | |
| 7,700,707 B2 | 4/2010 | Abhari et al. | |
| 9,051,683 B2 | 6/2015 | Brumbelow et al. | |
| 9,109,143 B2 | 8/2015 | Tse et al. | |
| 9,365,711 B2 | 6/2016 | Weeks | |
| 2009/0105407 A1 * | 4/2009 | Karjala | C09J 123/142 525/320 |
| 2011/0256336 A1 | 10/2011 | Koike | |
| 2016/0102429 A1 | 4/2016 | Uhl et al. | |

FOREIGN PATENT DOCUMENTS

| | | |
|---|---|---|
| EP | 2281859 B1 | 3/2014 |
| WO | 2009086091 | 7/2009 |
| WO | 2012051239 A1 | 4/2012 |
| WO | 2016029006 | 2/2016 |
| WO | 2017019529 A1 | 2/2017 |

OTHER PUBLICATIONS

PCT/US2021/030002, International Search Report and Written Opinion with a mailing date of Sep. 7, 2021.
PCT/US2021/030002, International Preliminary Report on Patentability with a mailing date of Oct. 27, 2022.
Office Action from corresponding Chinese application: 2021800423926 dated Mar. 12, 2024.

* cited by examiner

*Primary Examiner* — Jeffrey S Lenihan

(57) ABSTRACT

A composition comprising the following components: a) at least one propylene/ethylene interpolymer or at least one propylene/alpha-olefin interpolymer, each interpolymer comprising the following properties: i) a melting point, Tm, from 60° C. to 85° C., ii) a viscosity (177° C.) from 3,000 cP to 30,000 cP; b) at least one wax; c) at least one oil; and wherein the composition has a weight ratio component b to component c from 0.30 to 4.0.

18 Claims, No Drawings

HIGH FLOW PROPYLENE-BASED INTERPOLYMER COMPOSITIONS

CROSS-REFERENCE TO RELATED APPLICATIONS

This application claims the benefit of priority to U.S. Provisional Application No. 63/017,541, filed on Apr. 29, 2020, which is incorporated herein by reference in its entirety.

BACKGROUND OF THE INVENTION

Modular carpet tile manufacturers seek a recyclable, low-viscosity alternative to bitumen for use as a carpet backing. This alternative should meet the processing and performance requirements of the market. Ethylene/octene random copolymers and block copolymers with low melt flows (melt index approx. 30 g/10 min, 2.16 kg at 190° C.) are being used in commercial hot melt adhesive (HMA) carpet backing products. The HMA formulations, containing polymer, tackifier, wax and oil, meet the performance needs of modular carpet tile, however the current formulations are five to ten times more viscous than the bitumen incumbent formulation. As a result, current HMA formulations require specialized equipment to process, thereby limiting their marketability.

An adhesive for use as a modular carpet backing should have low viscosity (less than 30,000 cP, at 165° C., for unfilled formulations), good dimensional stability (as indicated by Young's Modulus), and high tensile strain at break. Also, the assembled modular carpet tile must be able to bend completely onto itself without cracking (good flexibility as indicated by high tensile strain at break).

U.S. Pat. No. 7,700,707 discloses an adhesive containing a functionalized component and an olefin polymer. The olefin polymer comprises 50 wt % or more of a C3-C30 alpha-olefin and at least 50 ppm of a diene. The polymer has, in part, a weight average molecular weight (Mw) of 10,000 to 100,000 g/mol, and a heat of fusion of 1 to 70 J/g. See claim 1. The polymer is compounded with tackifier, wax and/or oil, and used in adhesive formulations. See also, U.S. Pat. No. 7,524,910. U.S. Pat. No. 7,294,681 discloses a branched olefin polymer that has, in part, an Mw of 10,000 to 100,000 g/mol, an amorphous segment and a semi-crystalline segment. See claim 1. The polymer is compounded with tackifier, wax and/or oil, and used in adhesive formulations.

U.S. Publication 2016/0102429 discloses a carpet backing composition containing a filler, a compatibilizer, and a first polymer component comprising an elastomeric polymer. The compatibilizer provides a free radical source to bond the first polymer component and the filler. See claim 1. Additional polymers and compositions for applications that may include carpet components are disclosed in the following references: U.S. Pat. No. 9,051,683, U.S. Pat. Nos. 9,365,711, 7,357,971, U.S. Publication 2011/0256335, International Publication WO2016/029006, and International Publication WO2009/086091.

However, the adhesive compositions of the art do not provide for low viscosity polymer compositions (filled) that have the required mechanical properties useful for backings for modular carpet tiles. Thus, there is a need for adhesive compositions with low viscosity for good processability on standard manufacturing lines, and with improved performance in carpet backing formulations (for example, optimal modulus and high tensile strain at break). Preferably such compositions are recyclable. These needs are met by the following invention.

SUMMARY OF THE INVENTION

A composition comprising the following components:

a) at least one propylene/ethylene interpolymer or at least one propylene/alpha-olefin interpolymer, each interpolymer comprising the following properties:

i) a melting point, Tm, from 60° C. to 85° C., ii) a viscosity (177° C.) from 3,000 cP to 30,000 cP;

b) at least one wax;

c) at least one oil; and wherein the composition has a weight ratio component b to component c from 0.30 to 4.0.

DETAILED DESCRIPTION OF THE INVENTION

Compositions have been discovered that have improved mechanical properties (Young's Modulus, Tensile Strain at Break) and overall lower viscosity (165° C.). These compositions are well suited as carpet backing materials, especially backing materials for modular carpet tiles.

As discussed above, a composition is provided, which comprises the following components:

a) at least one propylene/ethylene interpolymer or at least one propylene/alpha-olefin interpolymer, each interpolymer comprising the following properties:

i) a melting point, Tm (DSC), from 60° C. to 85° C., ii) a viscosity (177° C.) from 3,000 cP to 30,000 cP;

b) at least one wax;

c) at least one oil; and wherein the composition has a weight ratio component b to component c from 0.30 to 4.0.

An inventive composition may comprise one or more embodiments as described herein. Each component (a, b, c) may comprise one or more embodiments as described herein.

In one embodiment, or a combination of two or more embodiments, each described herein, component a has a Tm≥62° C., or ≥63° C., or ≥64° C., or ≥65° C., or ≥66° C., or ≥67° C., or ≥68° C. Tm is determined from DSC as discussed in the "Test Methods" section. In one embodiment, or a combination of two or more embodiments, each described herein, component a has a Tm≤84° C., or ≤83° C., or ≤82° C., or ≤81° C., or ≤80° C., or ≤79° C., or ≤78° C., or ≤77° C., or ≤76° C.

In one embodiment, or a combination of two or more embodiments, each described herein, component a has a viscosity (177° C.)≥3,500 cP, or ≥4,000 cP, or ≥4,200 cP, or ≥4,400 cP, or ≥4,600 cP, or ≥4,800 cP, or ≥5,000 cP, or ≥5,200 cP, or ≥5,400 cP, or ≥5,600 cP, or ≥5,800 cP, or ≥6,000 cP, or ≥6,200 cP, or ≥6,400 cP, or ≥6,600 cP, or ≥6,800 cP, or ≥7,000 cP, or ≥7,200 cP. In one embodiment, or a combination of two or more embodiments, each described herein, component a has a viscosity (177° C.)≤28,000 cP, or ≤26,000 cP, or ≤24,000 cP, or ≤22,000 cP, or ≤20,000 cP, or ≤18,000 cP, or ≤16,000 cP, or ≤15,000 cP, or ≤14,000 cP, or ≤13,000 cP, or ≤12,000 cP, or ≤11,000 cP, or ≤10,000 cP.

In one embodiment, or a combination of two or more embodiments, each described herein, the composition has a weight ratio component b to component c≥0.35, or ≥0.40, or ≥0.45, or ≥0.50, or ≥0.52, or ≥0.54, or ≥0.56, or ≥0.58, or ≥0.60, or ≥0.62. In one embodiment, or a combination of two or more embodiments, each described herein, the composition has a weight ratio component b to component c≤3.9, or ≤3.8, or ≤3.7, or ≤3.6, or ≤3.5, or ≤3.4, or ≤3.3, or ≤3.2, or ≤3.0, or ≤2.8, or ≤2.6, or ≤2.4, or ≤2.2, or ≤2.0, or ≤1.8, or ≤1.6.

In one embodiment, or a combination of two or more embodiments, each described herein, component a has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc (1 cc=1 $cm^3$). In one embodiment, or a combination of two or more embodiments, each described herein, component a has a density ≤0.874 g/cc, or ≤0.873 g/cc, or ≤0.872 g/cc, or ≤0.871 g/cc, or ≤0.870 g/cc.

In one embodiment, or a combination of two or more embodiments, each described herein, component a is a propylene/ethylene interpolymer, and further an propylene/ethylene copolymer.

In one embodiment, or a combination of two or more embodiments, each described herein, component a has a density/Tm ratio ≥0.008, or ≥0.009, or ≥0.010, or ≥0.011 (g/(cc·° C.)). In one embodiment, or a combination of two or more embodiments, each described herein, component a has a density/Tm ratio ≤0.020, or ≤0.019, or ≤0.017, or ≤0.016, or ≤0.015, or ≤0.014 (g/(cc·° C.)).

In one embodiment, or a combination of two or more embodiments, each described herein, the composition further comprises component d): at least one filler.

In one embodiment, or a combination of two or more embodiments, each described herein, the composition has a weight ratio component d to component a≥5.00, or ≥6.00, or ≥7.00, or ≥8.00. In one embodiment, or a combination of two or more embodiments, each described herein, the composition has a weight ratio component d to component a≤15.0, or ≤14.0, or ≤13.0, or ≤12.0, or ≤11.0, or ≤10.0.

In one embodiment, or a combination of two or more embodiments, each described herein, the composition further comprises component e): an anhydride functionalized and/or carboxylic acid functionalized olefin-based polymer, and further an anhydride grafted and/or carboxylic acid grafted olefin-based polymer. In one embodiment, or a combination of two or more embodiments, each described herein, the component e is an anhydride functionalized and/or carboxylic acid functionalized propylene-based polymer, and further an anhydride grafted and/or carboxylic acid grafted propylene-based polymer.

In one embodiment, or a combination of two or more embodiments, each described herein, the composition has a weight ratio component a to component e≥15, or ≥16, or ≥17, or ≥18, or ≥19, or ≥20. In one embodiment, or a combination of two or more embodiments, each described herein, the composition has a weight ratio component a to component e≤30, or ≤28, or ≤26, or ≤25, or ≤24, or ≤23, or ≤22.

In one embodiment, or a combination of two or more embodiments, each described herein, the composition further comprises component f): at least one tackifier.

In one embodiment, or a combination of two or more embodiments, each described herein, the composition, with component d, has a viscosity (165° C.)≥10,000 cP, or ≥12,000 cP, or ≥14,000 cP, or ≥16,000 cP, or ≥18,000 cP, or ≥20,000 cP. In one embodiment, or a combination of two or more embodiments, each described herein, the composition, with component d, has a viscosity (165° C.)≤50,000 cP, or ≤48,000 cP, or ≤46,000 cP, or ≤44,000 cP, or ≤42,000 cP, or ≤40,000 cP, or ≤38,000 cP, or ≤36,000 cP, or ≤34,000 cP.

In one embodiment, or a combination of two or more embodiments, each described herein, the composition has a Tensile Strain at Break ≥6.0%, or ≥6.5%, or ≥7.0%, or ≥7.5%, or ≥8.0%, or ≥9.0%. In one embodiment, or a combination of two or more embodiments, each described herein, the composition has a Tensile Strain at Break ≥10%, or ≥11%, or ≥12%, or ≥13%, or ≥14%, or ≥15%.

In one embodiment, or a combination of two or more embodiments, each described herein, the composition has a Young's Modulus ≥100 MPa, or ≥105 MPa, or ≥110 MPa, or ≥112 MPa, or ≥114 MPa, or ≥116 MPa, or ≥118 MPa, or ≥120 MPa. In one embodiment, or a combination of two or more embodiments, each described herein, the composition has a Young's Modulus ≥150 MPa, or ≥200 MPa, or ≥250 MPa, or ≥300 MPa.

Also provided is an article comprising at least one component formed from the composition of any one embodiment, or a combination of two or more embodiments, each described herein. In one embodiment, or a combination of two or more embodiments, each described herein, the article is a carpet.

In one embodiment, or a combination of two or more embodiments, each described herein, an inventive composition further comprises a thermoplastic polymer, different from component a, in one or more features, such as monomer(s) types and/or amounts, Tm, Tc, Tg, density, viscosity (177° C.), Mn, Mw, MWD, or any combination thereof, and further in one or more features, such as monomer(s) types and/or amounts, Tm, Tc, Tg, density, viscosity (177° C.), or any combination thereof. Polymers include, but not limited to, ethylene-based polymers, propylene-based polymers, and olefin multi-block interpolymers. Suitable ethylene-based polymers include, but are not limited to, linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogeneously branched, long chain branched ethylene polymers). Examples of propylene-based polymers include polypropylene homopolymers and other propylene/ethylene copolymers.

Waxes

Waxes include, but are not limited to, paraffin waxes, microcrystalline waxes, polyethylene waxes, polypropylene waxes, Fischer-Tropsch waxes, oxidized Fischer-Tropsch waxes, hydroxy stearamide waxes, fatty amide waxes, and combinations thereof. Additional waxes include animal waxes, plant waxes, and combinations thereof.

Oils

Oils include, but are not limited to, mineral oils such as naphthenic, paraffinic, or hydrogenated (white) oils; vegetable oils and animal oils and their derivatives; petroleum derived oils; and combinations thereof. Additional oils include liquid polyolefins, such as liquid polybutene; and phthalates, such as diisoundecyl phthalate, diisononylphthalate, dioctylphthalates; and combinations thereof.

Tackifiers

Tackifiers are known in the art, and may be solids, semi-solids, or liquids at room temperature. Tackifiers include, but are not limited to, aliphatic hydrocarbon resins (hydrogenated or not), aromatic hydrocarbon resins (hydrogenated or not), hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof. Preferred tackifiers are selected from hydrogenated aliphatic hydrocarbon resins and hydrogenated aromatic hydrocarbon resins.

Additives

An inventive composition may include one or more additives. Nonlimiting examples of suitable additives include fillers, antioxidants, flame retardants, and antimicrobial agents. Fillers include, but are not limited to, calcium carbonate ($CaCO_3$), coal fly ash, barium sulfate, and clay (aluminum hydroxide silicate). Filler may also include high heat content fillers, such as limestone, marble, quartz, silica, and barite ($BaSO_4$).

In an embodiment, the composition comprises at least one antioxidant. An antioxidant protects the composition from degradation caused by reaction with oxygen, induced by such things as heat, light, or residual catalyst present in a commercial material. Suitable antioxidants include those commercially available from BASF, such as IRGANOX 1010, IRGANOX 1076 and IRGANOX 1726, which are hindered phenols. These primary antioxidants, which act as radical scavengers, may be used alone, or in combination with other antioxidants, such as phosphite antioxidants like IRGAFOS 168, also available from BASF. In an embodiment, the composition comprises from 0.1 wt %, or 0.2 wt %, or 0.3 wt % to 0.6 wt %, or 0.8 wt % or 1.0 wt % of at least one antioxidant. Weight percent is based on total weight of the composition.

DEFINITIONS

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers, such as one or more antioxidants.

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "propylene/ethylene interpolymer," as used herein, refers to a random interpolymer that comprises, in polymerized form, a majority weight percent of propylene (based on the weight of the interpolymer), and ethylene.

The term, "propylene/ethylene copolymer," as used herein, refers to a random copolymer that comprises, in polymerized form, a majority weight percent of propylene monomer (based on the weight of the copolymer), and ethylene, as the only two monomer types.

The term "propylene/alpha-olefin interpolymer," as used herein, refers to a random interpolymer that comprises, in polymerized form, a majority weight percent of propylene (based on the weight of the interpolymer), and an alpha-olefin.

The term, "propylene/alpha-olefin copolymer," as used herein, refers to a random copolymer that comprises, in polymerized form, a majority weight percent of propylene monomer (based on the weight of the copolymer), and an alpha-olefin, as the only two monomer types.

The term "ethylene-based polymer," as used herein, refers to a polymer that comprises, in polymerized form, 50 wt % or a majority weight percent of ethylene (based on the weight of the polymer), and optionally may comprise one or more comonomers.

The term. "anhydride functionalized and/or carboxylic acid functionalized olefin-based polymer," as used herein, refers to an olefin-based polymer that comprises anhydride functionality and/or carboxylic acid functionality.

The term. "anhydride functionalized and/or carboxylic acid functionalized propylene-based polymer," as used herein, refers to a propylene-based polymer that comprises anhydride functionality and/or carboxylic acid functionality.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A composition comprising the following components:

a) at least one propylene/ethylene interpolymer or at least one propylene/alpha-olefin interpolymer, each interpolymer comprising the following properties:

i) a melting point, Tm (DSC), from 60° C. to 85° C., ii) a viscosity (177° C.) from 3,000 cP to 30,000 cP;

b) at least one wax;

c) at least one oil; and wherein the composition has a weight ratio of component b to component c from 0.30 to 4.0.

B] The composition of A] above, wherein component a has a Tm≥62° C., or ≥63° C., or ≥64° C., or ≥65° C., or ≥66° C., or ≥67° C., or ≥68° C. Tm determined from DSC as discussed in the "Test Methods" section.

C] The composition of A] or B] above, wherein component a has a Tm≤84° C., or ≤83° C., or ≤82° C., or ≤81° C., or ≤80° C., or ≤79° C., or ≤78° C., or ≤77° C., or ≤76° C.

D] The composition of any one of A]-C] (A] through C]) above, wherein component a has a viscosity (177° C.)≥3,500 cP, or ≥4,000 cP, or ≥4,200 cP, or ≥4,400 cP, or ≥4,600 cP, or ≥4,800 cP, or ≥5,000 cP, or ≥5,200 cP, or ≥5,400 cP, or ≥5,600 cP, or ≥5,800 cP, or ≥6,000 cP, or ≥6,200 cP, or ≥6,400 cP, or ≥6,600 cP, or ≥6,800 cP, or ≥7,000 cP, or ≥7,200 cP.

E] The composition of any one of A]-D] above, wherein component a has a viscosity (177° C.)≤28,000 cP, or ≤26, 000 cP, or ≤24,000 cP, or ≤22,000 cP, or ≤20,000 cP, or ≤18,000 cP, or ≤16,000 cP, or ≤15,000 cP, or ≤14,000 cP, or ≤13,000 cP, or ≤12,000 cP, or ≤11,000 cP, or ≤10,000 cP.

F] The composition of any one of A]-E] above, wherein the composition has a weight ratio component b to component c≥0.35, or ≥0.40, or ≥0.45, or ≥0.50, or ≥0.52, or ≥0.54, or ≥0.56, or ≥0.58, or ≥0.60, or ≥0.62.

G] The composition of any one of A]-F] above, wherein the composition has a weight ratio component b to component c≤3.9, or ≤3.8, or ≤3.7, or ≤3.6, or ≤3.5, or ≤3.4, or ≤3.3, or ≤3.2, or ≤3.0, or ≤2.8, or ≤2.6, or ≤2.4, or ≤2.2, or ≤2.0, or ≤1.8, or ≤1.6.

H] The composition of any one of A]-G] above, wherein component a has a density/Tm ratio ≥0.008, or ≥0.009, or ≥0.010, or ≥0.011. Units=(g/(cc·° C.)).

I] The composition of any one of A]-H] above, wherein component a has a density/Tm ratio ≤0.020, or ≤0.019, or ≤0.017, or ≤0.016, or ≤0.015, or ≤0.014. Units=(g/(cc·° C.)).

J] The composition of any one of A]-I] above, wherein component a has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc (1 cc=1 $cm^3$).

K] The composition of any one of A]-J] above, wherein component a has a density ≤0.874 g/cc, or ≤0.873 g/cc, or ≤0.872 g/cc, or ≤0.871 g/cc, or ≤0.870 g/cc.

L] The composition of any one of A]-K] above, wherein component a has a crystallization temperature Tc≥15° C., or ≥16° C., or ≥17° C., or ≥18° C., or ≥19° C., or ≥20° C.

M] The composition of any one of A]-L] above, wherein component a has a crystallization temperature Tc≤40° C., or ≤39° C., or ≤38° C., or ≤37° C., or ≤36° C., or ≤35° C., or ≤34° C., or ≤33° C., or ≤32° C.

N] The composition of any one of A]-M] above, wherein component a has a glass transition temperature Tg≥−35° C., or ≥−34° C., or ≥−33° C., or ≥−32° C., or ≥−31° C.

O] The composition of any one of A]-N] above, wherein component a has a glass transition temperature Tg≤−25° C., or ≤−26° C., or ≤−27° C., or ≤−28° C., or ≤−29° C.

P] The composition of any one of A]-O] above, wherein component a has a weight average molecular weight Mw≥30,000 g/mol, or ≥32,000 g/mol, or ≥34,000 g/mol, or ≥36,000 g/mol, or ≥38,000 g/mol, or ≥40,000 g/mol, or ≥42,000 g/mol, or ≥43,000 g/mol.

Q] The composition of any one of A]-P] above, wherein component a has a weight average molecular weight Mw≤60,000 g/mol, or ≤58,000 g/mol, or ≤56,000 g/mol, or ≤54,000 g/mol, or ≤52,000 g/mol, or ≤50,000 g/mol, or ≤48,000 g/mol, or ≤47,000 g/mol.

R] The composition of any one of A]-Q] above, wherein component a has a number average molecular weight Mn≥10,000 g/mol, or ≥12,000 g/mol, or ≥14,000 g/mol, or ≥16,000 g/mol, or ≥18,000 g/mol.

S] The composition of any one of A]-R] above, wherein component a has a number average molecular weight Mn≤32,000 g/mol, or ≤30,000 g/mol, or ≤28,000 g/mol, or ≤26,000 g/mol, or ≤24,000 g/mol, or ≤22,000 g/mol, or ≤20,000 g/mol.

T] The composition of any one of A]-S] above, wherein, component a has a molecular weight distribution MWD (=Mw/Mn)≥1.80, or ≥2.00, or ≥2.10, or ≥2.20, or ≥2.30.

U] The composition of any one of A]-T] above, wherein component a has a molecular weight distribution MWD≤3.00, or ≤2.80, or ≤2.70, or ≤2.60, or ≤2.50, or ≤2.40.

V] The composition of any one of A]-U] above, wherein component a is a propylene/ethylene interpolymer, and further a propylene/ethylene copolymer.

W] The composition of any one of A]-U] above, wherein component a is a propylene/alpha-olefin interpolymer, and further a propylene/alpha-olefin copolymer.

X] The composition of W] above, wherein the alpha-olefin is a C4-C20 alpha-olefin, and further a C4-C10 alpha-olefin, and further a C4-C8 alpha-olefin.

Y] The composition of any one of A]-X] above, wherein the composition comprises ≤1.00 wt %, or ≤0.50 wt %, or ≤0.20 wt %, or ≤0.10 wt %, or ≤0.05 wt % of a filler, based on the weight of the composition.

Z] The composition of any one of A]-Y] above, wherein the composition does not comprise a filler.

AA] The composition of any one of A]-Z] above, wherein the composition, without filler, has a viscosity (165° C.)≥800 cP, or ≥900 cP, or ≥1000 cP, or ≥1100 cP, or ≥1200 cP.

BB] The composition of any one of A]-AA] above, wherein the composition, without filler, has a viscosity (165° C.)≤3000 cP, or ≤2800 cP, or ≤2600 cP, or ≤2400 cP, or ≤2200 cP, or ≤2200 cP, or ≤1800 cP, or ≤1600 cP, or ≤1400 cP.

CC] The composition of any one of A]-BB] above, wherein the composition, without filler, comprises ≥34 wt %, or ≥36 wt %, or ≥38 wt %, or ≥40 wt % of component a, based on the weight of the composition.

DD] The composition of any one of A]-CC] above, wherein the composition, without filler, comprises ≤50 wt %, or ≤48 wt %, or ≤46 wt %, or ≤44 wt % of component a, based on the weight of the composition.

EE] The composition of any one of A]-DD] above, wherein the composition, without filler, comprises ≥40 wt %, or ≥42 wt %, or ≥44 wt %, or ≥46 wt %, or ≥48 wt %, or ≥50 wt %, or ≥52 wt % of the sum of components a, b and c, based on the weight of the composition.

FF] The composition of any one of A]-EE] above, wherein the composition, without filler, comprises ≤70 wt %, or ≤68 wt %, or ≤66 wt %, or ≤64 wt %, or ≤62 wt %, or ≤60 wt %, or ≤58 wt % of the sum of components a, b and c, based on the weight of the composition.

GG] The composition of any one of A]-X] above, wherein the composition further comprises component d): at least one filler.

HH] The composition of GG] above, wherein the composition has a weight ratio component d to component a≥5.00, or ≥6.00, or ≥7.00, or ≥8.00.

II] The composition of GG] or HH] above, wherein the composition has a weight ratio component d to component a≤15.0, or ≤14.0, or ≤13.0, or ≤12.0, or ≤11.0, or ≤10.0.

JJ] The composition of any one of GG]-II] above, wherein the composition comprises ≥55.0 wt %, or ≥60.0 wt %, or ≥65.0 wt %, or ≥70.0 wt %, or ≥75.0 wt %, or ≥77.0 wt % of component d, based on the weight of the composition.

KK] The composition of any one of GG]-JJ] above, wherein the composition comprises ≤90.0 wt %, or ≤88.0 wt %, or ≤86.0 wt %, or ≤84.0 wt %, or ≤82.0 wt %, or ≤80.0 wt % of component d, based on the weight of the composition.

LL] The composition of any one of A]-KK] above, wherein the composition further comprises component e): an anhydride functionalized and/or carboxylic acid functionalized olefin-based polymer, and further an anhydride grafted and/or carboxylic acid grafted olefin-based polymer.

MM] The composition of LL] above, wherein component e is an anhydride functionalized and/or carboxylic acid functionalized propylene-based polymer, and further an anhydride grafted and/or carboxylic acid grafted propylene-based polymer.

NN] The composition of LL] or MM] above, wherein the composition has a weight ratio component a to component e≥15, or ≥16, or ≥17, or ≥18, or ≥19, or ≥20.

OO] The composition of any one of LL]-NN] above, wherein the composition has a weight ratio component a to component e≤30, or ≤28, or ≤26, or ≤25, or ≤24, or ≤23, or ≤22.

PP] The composition of any one of A]-OO] above, wherein the composition further comprises component f): at least one tackifier.

QQ] The composition of PP] above, wherein the composition has a weight ratio component a to component f≥0.80, or ≥0.85, or ≥0.90, or ≥0.95.

RR] The composition of PP] or QQ] above, wherein the composition has a weight ratio component a to component f≤1.20, or ≤1.15, or ≤1.10, or ≤1.05, or ≤1.00.

SS] The composition of any one of GG]-RR] above, wherein the composition, with component d, comprises ≥5.0 wt %, or ≥6.0 wt %, or ≥7.0 wt %, or ≥8.0 wt % of component a, based on the weight of the composition.

TT] The composition of any one of GG]-SS] above, wherein the composition, with component d, comprises ≤15.0 wt %, or ≤14.0 wt %, or ≤13.0 wt %, or ≤12.0 wt %, or ≤11.0 wt %, or ≤10.0 wt % of component a, based on the weight of the composition.

UU] The composition of any one of GG]-TT] above, wherein the composition, with component d, comprises ≥5.0 wt %, or ≥6.0 wt %, or ≥7.0 wt %, or ≥8.0 wt %, or ≥9.0 wt %, or ≥10.0 of the sum of components a, b and c, based on the weight of the composition.

VV] The composition of any one of GG]-W] above, wherein the composition, with component d, comprises ≤20 wt %, or ≤18 wt %, or ≤16 wt %, or ≤14 wt %, or ≤12 wt % of the sum of components a, b and c, based on the weight of the composition.

WW] The composition of any one of GG]-VV] above, wherein the composition, with component d, has a viscosity (165° C.)≥10,000 cP, or ≥12,000 cP, or ≥14,000 cP, or ≥16,000 cP, or ≥18,000 cP, or ≥20,000 cP.

XX] The composition of any one of GG]-WW] above, wherein the composition, with component d, has a viscosity (165° C.)≤50,000 cP, or ≤48,000 cP, or ≤46,000 cP, or ≤44,000 cP, or ≤42,000 cP, or ≤40,000 cP, or ≤38,000 cP, or ≤36,000 cP, or ≤34,000 cP.

YY] The composition of any one of A]-XX] above, wherein the ratio of "the viscosity (165° C.) of the composition with component d" to "the viscosity (165° C.) of the composition without component d"≥3.0, or ≥5.0, or ≥7.0, or ≥10.0, or ≥12.0, or ≥14.0, or ≥16.0, or ≥18.0, or ≥20.0, or ≥22.0, or ≥24.0.

ZZ] The composition of any one of A]-YY] above, wherein the ratio of "the viscosity (165° C.) of the composition with component d" to "the viscosity (165° C.) of the composition without component d"≤65, or ≤55, or ≤50, or ≤48, or ≤46, or ≤44, or ≤42, or ≤40, or ≤38, or ≤36, or ≤34, or ≤32, or ≤30.

A3] The composition of any one of A]-ZZ] above, wherein the composition has a Tensile Strain at Break ≥6.0%, or ≥6.5%, or ≥7.0%, or ≥7.5%, or ≥8.0%, or ≥9.0%.

B3] The composition of any one of A]-A3] above, wherein the composition has a Tensile Strain at Break ≥10%, or ≥11%, or ≥12%, or ≥13%, or ≥14%, or ≥15%.

C3] The composition of any one of A]-B3] above, wherein the composition has a Tensile Strain at Break ≤60%, or ≤50%, or ≤40%.

D3] The composition of any one of A]-C3] above, wherein the composition has a Young's Modulus ≥100 MPa, or ≥105 MPa, or ≥110 MPa, or ≥112 MPa, or ≥114 MPa, or ≥116 MPa, or ≥118 MPa, or ≥120 MPa.

E3] The composition of any one of A]-D3] above, wherein the composition has a Young's Modulus ≥150 MPa, or ≥200 MPa, or ≥250 MPa, or ≥300 MPa.

F3] The composition of any one of A]-E3] above, wherein the composition has a Young's Modulus ≤1000 MPa, or ≤900 MPa, or ≤800 MPa, or ≤700 MPa.

G3] The composition of any one of A]-F3] above, wherein the composition further comprises a thermoplastic polymer, different from component a, in one or more features, such as monomer(s) types and/or amounts, Tm, Tc, Tg, density, viscosity (177° C.), Mn, Mw, MWD, or any combination thereof, and further, in one or more features, such as monomer(s) types and/or amounts, Tm, Tc, Tg, density, viscosity (177° C.), or any combination thereof.

H3] An article comprising at least one component formed from the composition of any one of A]-G3] above.

I3] The article of H3] above, wherein the article is a carpet.

Test Methods

Differential Scanning Calorimetry (DSC)

Differential Scanning calorimetry (DSC) is used to measure Tm, Tc, Tg and crystallinity in propylene-based (PP) samples and ethylene-based (PE). Each sample (0.5 g) was compression molded into a film, at 25000 psi, 190° C., for 10-15 seconds. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 230° C. for PP (180° C. for PE). The sample was kept at this temperature for three minutes. Then the sample was cooled at a rate of 10° C./min to −60° C. for PP (−90° C. for PE), and kept isothermally at that temperature for three minutes. The sample was next heated at a rate of 10° C./min, until complete melting (second heat). Unless otherwise stated, melting point (Tm) and the glass transition temperature (Tg) of each polymer sample were determined from the second heat curve, and the crystallization temperature (Tc) was determined from the first cooling curve. The Tg and the respective peak temperatures for the Tm and the Tc were recorded. The percent crystallinity can be calculated by dividing the heat of fusion (Hf), determined from the second heat curve, by a theoretical heat of fusion of 165 J/g for PP (292 J/g for PE), and multiplying this quantity by 100 (for example, % cryst.=(Hf/165 J/g)×100 (for PP)).

Gel Permeation Chromatography (GPC)—Propylene-Based Polymers

A high temperature Gel Permeation Chromatography (GPC) system, equipped with Robotic Assistant Deliver (RAD) system for sample preparation and sample injection, was used. The concentration detector was an Infra-red detector (IR4) from Polymer Char Inc (Valencia, Spain).

Data collection was performed using Polymer Char DM 100 Data acquisition box. The system was equipped with an on-line solvent degas device from Agilent. The column compartment was operated at 150° C. The columns were four, Mixed A LS 30 cm, 20 micron columns. The solvent was nitrogen (N2) purged, 1,2,4-trichlorobenzene (TCB), containing approximately "200 ppm" of 2,6-di-t-butyl-4-methylphenol (BHT). The flow rate was 1.0 mL/min, and the injection volume was 200 μl. A "2 mg/mL" sample concentration was prepared by dissolving the sample in N2 purged and preheated TCB (containing 200 ppm BHT), for 2.5 hours at 160° C., with gentle agitation.

The GPC column set was calibrated by running twenty narrow molecular weight distribution polystyrene (PS) standards. The molecular weight (MW) of the standards ranged from 580 to 8,400,000 g/mol, and the standards were contained in six "cocktail" mixtures. Each standard mixture had at least a decade of separation between individual molecular weights. The equivalent polypropylene molecular weight of each PS standard was calculated using the following equation (1), with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}},$$

where $M_{PP}$ is PP equivalent MW, $M_{PS}$ is PS equivalent MW. The log K and a values of Mark-Houwink coefficients for PP and PS are listed below in Table A.

TABLE A

| Polymer | a | logK |
| --- | --- | --- |
| Polypropylene | 0.725 | −3.721 |
| Polystyrene | 0.702 | −3.900 |

A logarithmic molecular weight calibration was generated using a fourth order polynomial fit as a function of elution volume. Number average and weight average molecular weights were calculated according to the following equations:

$$M_n = \frac{\sum^i Wf_i}{\sum^i (Wf_i / M_i)}, \quad (2)$$

$$M_w = \frac{\sum^i (Wf_i * M_i)}{\sum^i (Wf_i)}, \quad (3)$$

where $w_{fi}$ and $M_i$, are the weight fraction and molecular weight of elution component i, respectively (note, MWD=Mw/Mn).

Melt Index

The melt flow rate MFR of a propylene-based polymer is measured in accordance with ASTM D-1238, condition 230° C./2.16 kg. The melt index 12 of an ethylene-based polymer is measured in accordance with ASTM D-1238, condition 190° C./2.16 kg.

Density

ASTM D4703 was used to make a polymer plaque for density analysis. ASTM D792, Method B, was used to measure the density of each polymer.

Viscosity of the Unfilled Composition

The viscosity, at 165° C. spindle SC4-31, of each unfilled composition was measured using a Brookfield Viscometer, model LVDV-1 Prime, with a Thermosel, following ASTM D1986 Standard Test for Apparent Viscosity of Hot Melt Adhesives and Coating Materials. The sample was added to the sample chamber, which was, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams) was heated to the required temperature, until the melted sample was about one inch below the top of the sample chamber. The viscometer apparatus was lowered, and the spindle was submerged into the sample chamber. Lowering of the viscometer was continued, until the brackets on the viscometer aligned on the Thermosel. The viscometer was turned on, and set to operate at a shear rate, which led to a torque reading in the range of 40 to 60 percent of the total torque capacity, based on the RPM output of the viscometer. Readings were taken every minute for 30 minutes, or until the values stabilized, at which point, a final reading was recorded.

Viscosity of Filled Composition

The viscosity of each filled composition was measured using a Brookfield Viscometer, model DV2THBTJ0 Prime with a Thermosel at 165° C., using spindle SC4-29. The sample (approximately 22 grams) was measured and added to the sample vial. The sample vial was placed in the Thermosel, and allow to melt. Next, the SC4-29 spindle was placed in the sample. Using RHEOCALC T software or "manual mode" on the instrument, the spindle was rotated for ten minutes at 3 RPM. Immediately after, the speed was increased to 40 RPM, and the data was collected every minute for 30 minutes. The viscosity was reported as the average of the last five readings (last 5 minutes).

Viscosity of the Polymer

The viscosity of each polymer (8-10 grams) was measured according to ASTM D3236, using a Brookfield Viscometer, model LVDV-1 Prime with a Thermosel. The viscosity was measured at 177° C., using spindle SC4-31.

Compression Molding

Each composition was compression molded, using a Carver press, into one or more plaques for physical testing. Plaque dimensions were "6 in. by 2.5 in. by 0.08 in thick." The polymer was pre-melted at 190° C. for one minute at 5,000 lb, and then pressed for five minutes at 30,000 lb, and then cooled between cold plates at 17° C. for one minute.

Microtensile Test—Mechanical Properties

Microtensile data, on each compression molded plaque (see above), was collected on an INSTRON 5565, equip with a 100 N load cell. Each plaque was die cut using an NAEF Punch Press with an "ASTM die D1708," to form a microtensile bar with thickness 0.08 in (inch). A strain rate of 0.100 in/min was applied to each tensile bar until failure (break defined as load <0.25 N). A minimum of three specimens and maximum of five specimens were collected per composition, and the average value of each property was reported.

Experimental

Commercial Materials

Commercial materials are listed in Table 1 below.

TABLE 1

| Commercial Materials | |
|---|---|
| Material | Description and Characteristics |
| VERSIFY 4200* | Propylene-ethylene random copolymer, density of 0.876 g/cc, MFR of 25 g/10 min, available from the Dow Chemical Company. |
| VISTAMAXX 8880 | Propylene-ethylene random copolymer, density of 0.879 g/cc, viscosity (190° C.) of 1200 cP, available from Exxon Mobil Chemical Company. |
| MORTON 100P | Polypropylene/maleic anhydride copolymer, available from the Dow Chemical Company. |
| Tackifier | REGALITE R1090, C9-aromatic, fully hydrogenated tackifier with Tg of 43° C., available from Eastman Chemical Company. |
| Wax | SASOL H1, FischerTropsch wax. |
| Oil | SUNPAR 120, solvent dewaxed heavy paraffinic oil. |
| CARBOCIA 310 | Calcium carbonate ($CaCO_3$) filler. Available from Carbocia. |
| IRGANOX 1010 | Phenolic antioxidant. Available from BASF. |

*Estimated Viscosity (at 190° C.) >500,000 cP.

Polymer Syntheses and Properties

Each propylene-ethylene copolymer was produced using a solution polymerization process, in a single, liquid full reactor configuration. Solvent (ISOPAR E) pressure was delivered using industry standard positive displacement pump technology. The ISOPAR E flow was metered to maintain the solvent to polymer production ratio noted in Table 2 below. Propylene pressure was also delivered using standard positive displacement pump technology. Propylene was metered to maintain the solvent to propylene ratio noted in Table 2. Propylene was combined with the solvent downstream of the solvent flow meter. Ethylene pressure was delivered using industry standard gas compressor technology. The ethylene flow was metered to maintain the propylene to ethylene ratio noted in Table 2. The hydrogen supply pressure was delivered from gas cylinders. The hydrogen flow was metered to maintain the hydrogen to polymer production ratio noted in Table 2. Hydrogen was combined with the ethylene gas downstream of the ethylene flow meter. The combined gas stream was mixed with the combined liquid stream. Solvent, propylene, and ethylene flows were measured using standard coriolis meters, and hydrogen flow was measured using a standard thermal mass flow meter. The polymer viscosity was controlled by controlling the hydrogen to polymer production ratio. To reduce the polymer viscosity, the hydrogen to polymer ratio was increased, which yielded a greater hydrogen flow to the reactor. To increase the polymer viscosity the hydrogen to polymer ratio was decreased, which resulted in a lower hydrogen flow to the reactor.

The combined feed stream was routed through a heat exchanger system to cool the stream to the target feed temperature noted in Table 2. From the heat exchanger system, flow was directed to the reactor, where it was injected into the polymerization liquor. The feed pressure was not directly controlled. The control point was the reactor pressure. Therefore, the feed pressure was a result of the pressure drop in the feed system for the given total flow rate.

The pressure required to inject each of the catalyst components into the reactor was delivered using industry standard positive displacement pump technology. The flow was measured using coriolis meters. Each component was separately pumped and metered. The catalyst complex was injected into the reactor separately from the cocatalysts. Cocatalyst 2 was combined with Cocatalyst 1, and the combined stream was injected into the reactor. As a result of this configuration, the catalyst complex was activated in the reactor.

The flow of catalyst complex was adjusted to control the propylene conversion at the value noted in Table 2. The Cocatalyst 1 and Cocatalyst 2 flows were controlled to maintain a constant molar ratio of each component to the catalyst. Ethylene conversion was controlled by the selected catalyst complex, and its relative reactivity of propylene to ethylene for the propylene conversion set point.

Two different catalyst complexes from the bis-biphenylphenoxy family were used to produce the copolymers. Catalyst A was used to make HIPO 1 and HIPO 4, while Catalyst B was used to produce HIPO 2 and HIPO 3. Procedures for synthesizing each of Catalyst A and Catalyst B may be found in WO2012/027448 and WO2007/136493, respectively. Both catalysts contained a hafnium metal center (M), and the structures are shown below in Table 3. Each catalyst was activated by contacting the metal-ligand complex with the bis(hydrogenated tallow alkyl)methyl tetrakis (pentafluoro-phenyl)borate(1<->) amine (Cocatalyst 1) and MMAO (Cocatalyst 2). See Table 3.

The exothermic heat of polymerization was removed through the adiabatic temperature rise of the solvent and reactants from the feed to reactor temperature, and via nonadiabatic heat removal via heat exchange, to maintain the reactor temperature in Table 2. Water was injected into the reactor effluent to terminate the polymerization reaction. The polymer was isolated in bale form. The polymer may be stabilized with 1000-1500 ppm of one or more antioxidants. Polymer properties are shown in Tables 4A and 4B.

TABLE 2

| Polymerization Conditions | | | | | |
|---|---|---|---|---|---|
| Parameter | Units | HIPO 1 | HIPO 2 | HIPO 3 | HIPO 4 |
| Feed Temperature | ° C. | 11 | 10 | 10 | 11 |
| Feed Pressure | psig | 530 | 600 | 600 | 530 |
| Solvent/Polymer | lbs/lbs | 6.7 | 2.0 | 1.9 | 7.1 |
| Solvent/Propylene | lbs/lbs | 6.5 | 2.0 | 2.0 | 6.5 |
| Propylene/Ethylene | lbs/lbs | 8.7 | 8.7 | 7.5 | 13.5 |
| Hydrogen/Polymer | grams/tonne | 376 | 210 | 225 | 306 |
| Reactor Temperature | ° C. | 130 | 155 | 155 | 130 |
| Reactor Pressure | psig | 525 | 550 | 550 | 525 |
| Catalyst Type | — | Catalyst A | Catalyst B | Catalyst B | Catalyst A |
| Propylene Conv* | wt % | 87.2 | 89.6 | 90.0 | 84.2 |
| Ethylene Conv** | wt % | 99.1 | 97.4 | 97.7 | 99.0 |

TABLE 2-continued

| Polymerization Conditions | | | | | |
|---|---|---|---|---|---|
| Parameter | Units | HIPO 1 | HIPO 2 | HIPO 3 | HIPO 4 |
| Catalyst Efficiency | MMlbs Polymer/lb Hf | 4.5 | 1.1 | 1.2 | 4.3 |
| Cocatalyst 1/Catalyst | moles Cocat 1/mole Hf | 1.2 | 2.5 | 2.5 | 1.2 |
| Cocatalyst 2/Catalyst | moles Al/mole Hf | 10.0 | 50.0 | 50.0 | 10.0 |

$$*\text{Propylene Conversion} = 100 * \frac{\left(\begin{array}{c}\text{Propylene Reactor Feed Flow} - \\ \text{Propylene Flow Exiting Devolatilzation}\end{array}\right)}{\text{Propylene Reactor Feed Flow}}$$

$$**\text{ Ethylene Conversion} = 100 * \frac{\left(\begin{array}{c}\text{Ethylene Reactor Feed Flow} - \\ \text{Ethylene Flow Exiting Devolatilzation}\end{array}\right)}{\text{Ethylene Reactor Feed Flow}}$$

TABLE 3

| Catalysts and Cocatalysts | |
|---|---|
| Catalyst A | Catalyst B |
| 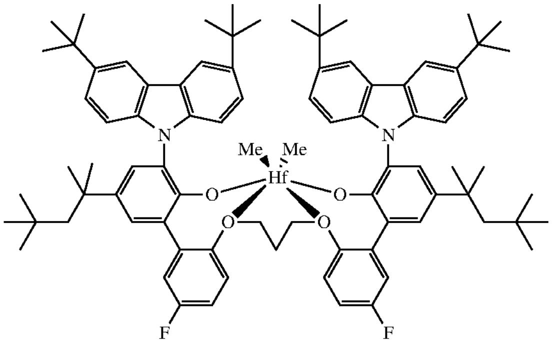 | 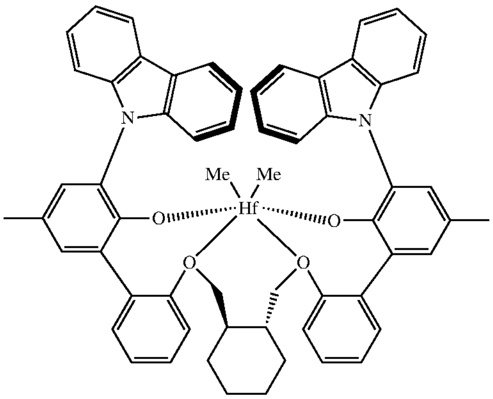 |
| Cocatalyst 1 | Cocatalyst 2 |
| 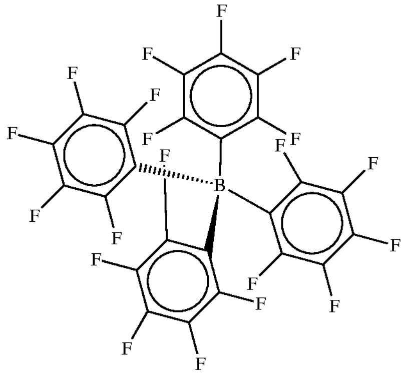<br>$R_2MeNH^+$ (R = hydrogenated tallow alkyl) | 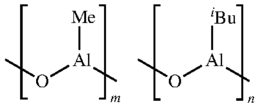 |

TABLE 4A

| Polymer Properties (Density, DSC, Visc.) | | | | | | |
|---|---|---|---|---|---|---|
| P/E | Density (g/cc) | Tm (° C.) | Tc (° C.) | Tg (° C.) | Density/Tm (g/(cc-° C.) | Viscosity at 177° C. (cP) |
| HIPO 1 | 0.875 | 91.7 | 57.3 | −23.7 | 0.0095 | 10,600 |
| HIPO 2 | 0.870 | 76 | 32.0 | −28.9 | 0.011 | 8,132 |

TABLE 4A-continued

| Polymer Properties (Density, DSC, Visc.) | | | | | | |
|---|---|---|---|---|---|---|
| P/E | Density (g/cc) | Tm (° C.) | Tc (° C.) | Tg (° C.) | Density/Tm (g/(cc-° C.) | Viscosity at 177° C. (cP) |
| HIPO 3 | 0.866 | 68.2 | 20.63 | −30.3 | 0.013 | 7,974 |
| HIPO 4 | 0.886 | 106.1 | 71.1 | −20.8 | 0.0084 | 9,150 |

TABLE 4B

| Polymer Properties (GPC) | | | |
|---|---|---|---|
| P/E | Mw (g/mol) | Mn (g/mol) | MWD |
| HIPO 1 | 49,085 | 23,806 | 2.06 |
| HIPO 2 | 45,855 | 19,440 | 2.36 |
| HIPO 3 | 45,088 | 19,160 | 2.35 |
| HIPO 4 | 43,074 | 22,463 | 3.01 |

Study—Filled Compositions

Composition—Compounding with Filler

Compositions are shown in Table 5. The compounding of each filled composition was performed on HAAKE RHEOMIX 3000, rotating at 8 RPM. The polymer (HIPO or commercial polymer) and the functionalized copolymer (MORTON 100P) were added to the mixer at 140° C., and mixed until molten. The filler ($CaCO_3$) was divided into three equal portions. The first portion of the filler was added to the mixer, and briefly allowed to mix. Then the second portion of the filler was added to the mixer and the ram was lowered. The RPM was increased to 60 RPM, mixing continued for one minute, and then the RPM was decreased to 15 RPM, and mixing continued for one minute. The final portion of the filler, the wax, and the IRGANOX 1010 were added, the ram was lowered, and the resulting mixture was mixed at 60 RPM for ten minutes. Next the tackifier and the oil were added, the ram was lowed, and the resulting mixture was mixed for two minutes, and then the RPM was decreased to 15 RPM, and mixing continued for one minute. The mixture that collected on the ram was scraped back into the bowl, the RPM was increased to 60 RPM, and mixing continued for two minutes. The RPM was increased to 90 RPM, and mixing continued for three minutes. The final mixture was collected from the HAAKE RHEOMIX and pressed flat for future testing (compression molding and microtensile testing).

Each composition of Table 5 was compression molded (see "Test Methods" section), and the mechanical properties were examined by microtensile testing. The mechanical properties, are shown in Table 6.

TABLE 5

| Filled Compositions | | | | | | | | | | | |
|---|---|---|---|---|---|---|---|---|---|---|---|
| | Comp. A | Comp. B | Comp. C | Comp. D | Inv. 1 | Inv. 2 | Comp. E | Comp. F | Inv. 3 | Inv. 4 | Comp. G |
| VISTAMAXX 8880 | | 42.5 | | | | | | | | | |
| HIPO 1 (0.875) | | | | 42.5 | | | | | | | |
| HIPO 2 (0.870) | | | | | | 42.5 | 42.5 | 42.5 | 42.5 | 42.5 | 42.5 |
| HIPO 3 (0.866) | | | | | 42.5 | | | | | | |
| HIPO 4 (0.886) | | | 42.5 | | | | | | | | |
| VERSIFY 4200 | 32.0 | | | | | | | | | | |
| MORTON 100P | | 2.0 | 2.0 | 2.0 | 2.0 | 2.0 | 2.0 | 2.0 | 2.0 | 2.0 | 2.0 |
| AMPLIFY GR204 | 2.0 | | | | | | | | | | |
| REGALITE 1090 | 36.0 | 42.5 | 42.5 | 42.5 | 42.5 | 42.5 | 42.5 | 42.5 | 42.5 | 42.5 | 42.5 |
| SUNPAR 120 | 18.0 | 5.0 | 5.0 | 5.0 | 5.0 | 5.0 | 1.0 | 2.0 | 3.0 | 8.0 | 12.0 |
| SASOL H1 | 12.0 | 8.0 | 8.0 | 8.0 | 8.0 | 8.0 | 12.0 | 11.0 | 10.0 | 5.0 | 1.0 |
| CARBOCIA 310 | 400.0 | 400.0 | 400.0 | 400.0 | 400.0 | 400.0 | 400.0 | 400.0 | 400.0 | 400.0 | 400.0 |
| IRGANOX 1010 | 0.3 | 0.3 | 0.3 | 0.3 | 0.3 | 0.3 | 0.3 | 0.3 | 0.3 | 0.3 | 0.3 |
| Total Parts | 500.3 | 500.3 | 500.3 | 500.3 | 500.3 | 500.3 | 500.3 | 500.3 | 500.3 | 500.3 | 500.3 |
| polymer/tackifier wt. ratio | 0.9 | 1.0 | 1.0 | 1.0 | 1.0 | 1.0 | 1.0 | 1.0 | 1.0 | 1.0 | 1.0 |
| wax/oil wt. ratio | 0.67 | 1.60 | 1.60 | 1.60 | 1.60 | 1.60 | 12.00 | 5.50 | 3.33 | 0.63 | 0.08 |
| oil/polymer wt. ratio | 0.56 | 0.12 | 0.12 | 0.12 | 0.12 | 0.12 | 0.02 | 0.05 | 0.07 | 0.19 | 0.28 |

As seen in Table 6, the Inventive Compositions 1~4 show the optimum combination of high Young's Modulus and high Tensile Strain at Break. The inventive compositions demonstrate improved flexibility, as seen in the higher tensile strain at break (%) values. Also, the Young's Modulus is a good indicator for the thermal stability and expansion strength of the composition. Inventive Compositions 1 and 4 have the best combination of sufficiently high modulus values (less than 450 MPa and greater than 60 MPa) and high tensile strain at break values, and this combination allows for reduced buckling of the carpet backsheet during the use-life of the carpet, in addition to the improved flexibility of the carpet backsheet.

The unfilled viscosity of all the compositions, except Comparative Composition A, are well below the manufacture requirement of an unfilled viscosity (165° C.) of 30,000 cP or less. It is noted that Comparative Composition A was formed from the high viscosity copolymer VERSIFY 4200. Also, each inventive composition, being a filled thermoplastic, may be re-extruded multiple times with little loss of mechanical performance. This can be done with a variety of conversion techniques, including the most commonly used practice of single screw or twin screw extrusion. This also allows these formulations to be recycled in carpet applications or other applications, where a highly-filled formulation will deliver the needed performance properties.

TABLE 6

Mechanical Properties

| | Comp. A | Comp. B | Comp. C | Comp. D | Inv. 1 | Inv. 2 | Comp. E | Comp. F | Inv. 3 | Inv. 4 | Comp. G |
|---|---|---|---|---|---|---|---|---|---|---|---|
| Brookfield Visc @165° C. (cP) | NA | 13200 | 28200 | 28160 | 20800 | 25280 | 19720 | 20400 | 25960 | 33080 | 18840 |
| Young's Modulus, MPa | 174 | 729 | 996 | 757 | 120 | 568 | 818 | 741 | 680 | 319 | 62 |
| Tensile Strain at Break, % | 17.7 | 2.2 | 1.1 | 2.6 | 21.9 | 9.9 | 2.9 | 4.7 | 7.0 | 15.4 | 25.5 |
| Tensile Strain at Break, SD | 3.07 | 0.1 | 0.06 | 1.46 | 1.28 | 2.49 | 0.8 | 1.25 | 1.72 | 2.25 | 5.73 |
| Tensile Strain at Yield, % | 3.696 | — | — | 2.3 | 5.0 | 2.7 | 2.0 | 2.2 | 1.9 | 3.2 | 7.0 |
| Tensile Stress at Yield, psi | 432 | 2 | — | 1160 | 429 | 740 | 1100 | 1035 | 874 | 522 | 329 |
| Peak Force, lbf | 6 | 18 | 17 | 20 | 7 | 13 | 18 | 19 | 14 | 9 | 6 |
| Maximum Tensile Stress, psi | 432 | 1020 | 1070 | 1181 | 429 | 740 | 1099 | 1035 | 874 | 522 | |
| Max Load, N | | | | | | | | | | | 329.4 |
| Unfilled Visc.* @165° C. (cP) | — | 461 | 1464 | 1650 | 1262 | 1310 | 2010 | 1305 | 1300 | 1255 | 1300 |
| Brookfield (RPM) | — | 30 | 10 | 12 | 12 | 12 | 10 | 12 | 12 | 12 | 12 |

*Unfilled compositions were prepared by a separate compounding of the materials of the composition. The compounding of each unfilled composition was performed on HAAKE RHEOMIX 3000, rotating at 30-50 RPM. For each composition, the raw materials were dry mixed, before adding to the mixer. The mixer was preheated to 180° C. The mixing was continued for five minutes after the ram was secured in the down position.

What is claimed is:

1. A composition comprising the following components:

a) at least one propylene/ethylene interpolymer comprising i) a melting point, Tm, from 60° C. to 85° C., and ii) a viscosity (177° C.) from ≥3,000 cP to ≤10,000 cP;

b) at least one wax;

c) at least one oil;

d) at least one filler; and e) at least one anhydride functionalized and/or carboxylic acid functionalized propylene-based polymer or anhydride grafted and/or carboxylic acid grafted propylene-based polymer;

wherein the composition has a weight ratio of component b to component c from 0.30 to 4.0, wherein the composition has a weight ratio of component d to component a from ≥5.0 to ≤15.0, and wherein the composition has a weight ratio of component a to component e from ≥15 to ≤30.

2. The composition of claim 1, wherein component a has a density ≥0.860 g/cc.

3. The composition of claim 1, wherein component a has a density ≤0.874 g/cc.

4. The composition of claim 1, wherein the composition further comprises component f): at least one tackifier.

5. The composition of claim 1, wherein the composition has a viscosity (165° C.) ≥10,000 cP.

6. The composition of claim 1, wherein the composition has a viscosity (165° C.)≤50,000 cP.

7. The composition of claim 1, wherein the composition has a Tensile Strain at Break ≥6.0%.

8. The composition of claim 1, wherein the composition has a Tensile Strain at Break ≥12%.

9. The composition of claim 1, wherein the composition has a Young's Modulus ≥100 MPa.

10. An article comprising at least one component formed from the composition of claim 1.

11. The composition of claim 1, wherein the composition has a weight ratio of component a to component e from ≥19 to ≤23.

12. The composition of claim 1, wherein component e is at least one anhydride functionalized and/or carboxylic acid functionalized propylene-based polymer.

13. The composition of claim 1, wherein component e is a polypropylene/maleic anhydride copolymer.

14. The composition of claim 1, wherein the composition has a weight ratio of component b to component c from ≥0.5 to ≤3.5.

15. The composition of claim 1, the composition has a weight ratio of component d to component a from ≥8 to ≤11.

16. The composition of claim 1, the composition has a weight ratio of component d to component a from ≥8 to ≤10.

17. The composition of claim 1, wherein component d comprises calcium carbonate ($CaCO_3$), barite ($BaSO_4$), barium sulfate, aluminum hydroxide silicate, coal fly ash, limestone, marble, quartz, silica, or a combination thereof.

18. The composition of claim 1, wherein component dis calcium carbonate ($CaCO_3$).

* * * * *